(12) United States Patent
Dickey et al.

(10) Patent No.: US 6,665,818 B1
(45) Date of Patent: Dec. 16, 2003

(54) APPARATUS AND METHOD FOR DETECTING, DIAGNOSING, AND HANDLING DEADLOCK ERRORS

(75) Inventors: Kent Andrew Dickey, Westford, MA (US); James Curtis Farmer, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,659

(22) Filed: Apr. 27, 2000

(51) Int. Cl.[7] .............................................. G06F 11/00
(52) U.S. Cl. ......................................... 714/32; 714/57
(58) Field of Search .............................. 714/10, 23, 27, 714/32, 34, 45, 55, 57

(56) References Cited

U.S. PATENT DOCUMENTS

| | | | | |
|---|---|---|---|---|
| 5,513,319 A | * | 4/1996 | Finch et al. | |
| 5,594,922 A | * | 1/1997 | Suzuki et al. | |
| 5,680,402 A | * | 10/1997 | Olnowich et al. | |
| 5,838,898 A | * | 11/1998 | Sawai | |
| 6,061,810 A | * | 5/2000 | Potter | |
| 6,304,895 B1 | * | 10/2001 | Schneider et al. | |
| 6,393,589 B1 | * | 5/2002 | Smit et al. | |

* cited by examiner

*Primary Examiner*—Robert Beausoliel
*Assistant Examiner*—Gabriel Chu (57) ABSTRACT

A method and apparatus for detecting, enabling and disabling deadlock errors, and recording deadlock information in the error logs of a data processing system even after a power-on reset. One embodiment of the invention involves a method for indicating a deadlock error in a data processing system capable of having a deadlock error. The method includes indicating that an error is a deadlock error, providing an input signal to set a deadlock error enable circuit having an output signal indicating that the deadlock error will cause a deadlock reset signal to be asserted, logically ORing deadlock error signals to produce a deadlock output; and logically ANDing the deadlock output and the output signal of the deadlock error enable circuit to produce the deadlock reset signal. A second embodiment of the invention involves a data processing system or an error log system, capable of having a deadlock error selected from several deadlock errors. The data processing system or error log system includes a deadlock error enable circuit having an output signal indicating that the deadlock error will cause a deadlock reset signal to be asserted, a first combinational logic circuit to logically OR the deadlock signals, having a deadlock output, and a second combinational logic circuit to logically AND the deadlock output of the first combinational logic circuit and the output signal of the deadlock error enable circuit, to produce the deadlock reset signal.

20 Claims, 7 Drawing Sheets

APPARATUS AND METHOD FOR DETECTING, DIAGNOSING, AND HANDLING DEADLOCK ERRORS

BACKGROUND OF THE INVENTION

1. Field of the Invention

This invention relates generally to an improvement in handling errors in a data processing system, and more specifically to detecting, diagnosing, and handling deadlock errors occurring in a data processing system.

2. Description of the Prior Art

Many data processing systems (e.g., computer systems, programmable electronic systems, telecommunication switching systems, control systems, and so forth) detect different types of errors. Some errors indicate a minor problem while other errors indicate a serious problem. Because data processing systems are being designed to offer higher percentages of "up-time," it is critical to know how severe an error is and whether the system must be shut down to limit data corruption, or if the system can continue to operate without impact to the user.

These are some typical error levels of severity:

(1) An advisory error does not interrupt normal operations and is recorded only for informational purposes.

(2) A correctable error is an error that can be corrected by hardware or software and which is logged.

(3) An uncorrectable error is an error which may require some software help to keep the error contained and keep the system running.

(4) A fatal error is an error that can cause data corruption if the data processing system or subsystem is not halted immediately.

(5) A deadlock failure occurs when two or more processes are competing for the same resource, or when these processes cannot proceed to completion because the resource is unavailable.

There have been several ways to log and report errors in data processing systems. Most data processing chips provide an error logging and recovery strategy for likely errors. However, unforeseen errors (which might be design mistakes) could cause all chip processing to halt, preventing the usual error handling. Such errors are called deadlock errors, and result in the data processing system appearing to "freeze" until it is manually reset, or a watchdog device performs the reset.

Most data processing systems do not even attempt to handle deadlock error situations. Those systems that attempt to handle such errors typically set up some type of external watchdog device that detects when the data processing system is not making some checkpoint or progress for a period of time. This watchdog device, since it is external, cannot determine the cause of the deadlock error, and therefore can only reset the system and assume that the deadlock error will not happen again. This watchdog device cannot determine which component is unavailable, and it adds extra cost to system deployment.

Other more specific types of system reset have been tried in the past. Some bus protocols provide a special signal that causes a reset in all bus states, but this special signal ignores all pending transactions. The disadvantage of these prior art strategies is that they only work on one bus at a time (a chip connecting to multiple buses would need many different detection circuits) and are complex to implement. Since these strategies generally do not reset all chip states through the already existing reset circuitry, these special signals become require a significant amount of extra logic, and thus are susceptible to many design errors themselves.

In typical prior art systems, no deadlock information is recorded in the error register to allow software or users to determine when or why multiple deadlock errors have occurred. Such deadlock error information would be desirable to allow software or users to determine if deadlock errors are occurring, what is causing the deadlock error, and if a system reset after a severe error is caused by a deadlock error. For example, a system reset could continuously reoccur if deadlock errors are not disabled and the cause of a deadlock error is not corrected.

It would be desirable to have the capability to enable or disable deadlock errors, record extensive information about deadlock errors, and be able to determine from the error log registers after a system reset that the system reset was caused by a deadlock error.

SUMMARY OF THE INVENTION

An object of the invention is to provide the capability to enable or disable deadlock errors, record extensive information about deadlock errors, and be able to determine from the error log registers after a system reset that the system reset was caused by a deadlock error.

A first aspect of the invention is directed to a method for indicating a deadlock error in a data processing system capable of having at least one deadlock error. The method includes indicating that an error is at least one deadlock error, providing an input signal to set a deadlock error enable circuit having an output signal indicating that the deadlock error will cause a deadlock reset signal to be asserted, logically ORing one or more signals from said at least one deadlock error, with a first combinational logic circuit having an deadlock output, and logically ANDing the deadlock output of the first combinational logic circuit and the output signal of the deadlock error enable circuit with a second combinational logic circuit having an output to produce the deadlock reset signal.

A second aspect of the invention is directed to a data processing system or error log system, capable of having a deadlock error selected from a plurality of deadlock errors. The data processing system or error log system includes a deadlock error enable circuit receiving a plurality of input enable signals and having an output signal indicating that the deadlock error will cause a deadlock reset signal to be asserted, a first combinational logic circuit to logically OR the plurality of deadlock signals, having an deadlock output, and a second combinational logic circuit to logically AND the deadlock output of the first combinational logic circuit and the output signal of the deadlock error enable circuit, having an output to produce said deadlock reset signal.

These and other objects and advantages of the invention will become apparent to those skilled in the art from the following detailed description of the invention and the accompanying drawings.

DETAILED DESCRIPTION OF PREFERRED EMBODIMENTS OF THE INVENTION

This invention provides a method and apparatus for detecting, enabling and disabling deadlock errors, and recording deadlock information in the error logs of a data processing system even after a power-on reset.

Figure 1:
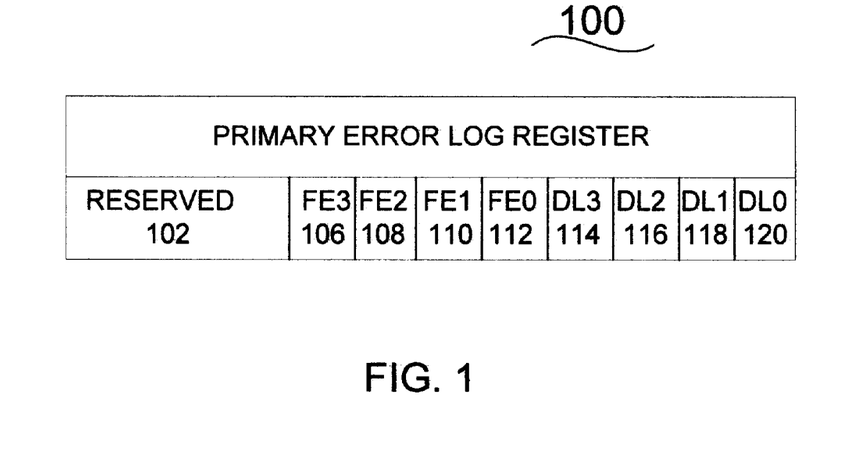
FIG. 1 shows one register that is used for the primary error log, which will log various types of errors, such as fatal errors and deadlock errors.

FIG. 1 shows one register that is used for the primary error log 100, which will log various types of errors, such as fatal errors and deadlock errors. In one preferred embodiment, the primary error log 100 has a unique bit for each error. In this example, there is a reserved field 102 and there are 4 bits for 4 unique fatal (FE) errors and 4 bits for 4 unique deadlock (DL) errors, such as (FE3) 106, (FE2) 108, (FE1) 110, (FE0) 112, (DL3) 114, (DL2) 116, (DL1) 118, and (DL0) 120. In one embodiment of the invention, the error bits can be grouped in adjacent bits according to their severity level. In another embodiment of the invention, the error bits can be grouped according to some other criteria, e.g., physical location of the errors.

The primary error log 100 will usually have no error bits set or only one error bit set in one or more groups of bits grouped according to error severity level. Thus, it is possible for errors in all levels of error severity to be set in the primary error log 100, such as when a fatal error is detected as the first error, and the fatal error is followed by a deadlock error.

Errors can be reported with encoded bits or with individual, dedicated bits. But in preferred embodiments of the invention, each error is reported with an individual bit, as shown in FIG. 1. Each unique type of error has a corresponding bit in each of the primary error log and secondary error log registers. This allows firmware or diagnostic software to directly determine exactly which type of error occurred without decoding delay, and this avoids transitory error bit states that might be erroneously interpreted as the actual errors. For example, erroneous interpretation is possible if the data processing system fails completely in a very sudden event, and one or more transitory error bits are frozen at incorrect states in diagnostic registers that are later read after recovery from the failure.

Figure 2:
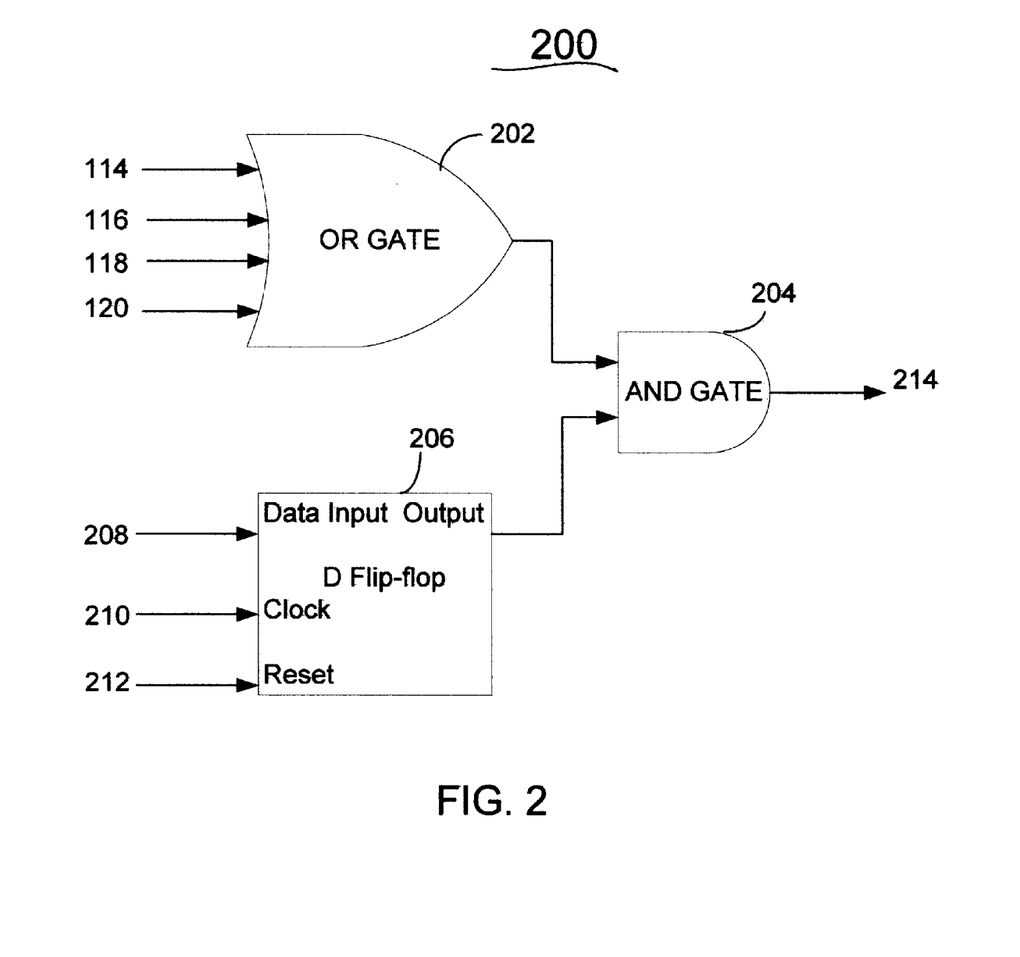
FIG. 2 shows a deadlock circuit, including a logical OR gate, a logical AND gate, and a deadlock enable flip-flop, in accordance with one preferred embodiment of the invention.

FIG. 2 shows a deadlock circuit 200, including logical OR gate 202, logical AND gate 204, and deadlock enable flip-flop 206, in accordance with one preferred embodiment of the invention. Deadlock bits 114, 116, 118, and 120 are the input signals to logical OR gate 202, which produces an output signal that in an input signal to logical AND gate 204. Deadlock enable flip-flop 206 produces an output signal that is an input signal to logical AND gate 204 and receives deadlock enable signal 208, clock signal 210, and synchronous reset signal 212 as input signals. Logical AND gate 204 produces output signal 214 which indicates that one or more deadlock errors have occurred and deadlock errors are enabled. Deadlock enable signal 208 is typically set by software at an appropriate time in the operation of the data processing system. In one preferred embodiment of the invention, all the input and output signals are active in positive logic (i.e., a high voltage level corresponds to a logical "1" and a low voltage level corresponds to a logical "0"). In one preferred embodiment of the invention, deadlock enable flip-flop 206 is a positive edge-triggered D flip-flop. Alternative embodiments of the invention could use negative logic with appropriate logic gates, or could use other types of flip-flops, such as negative edge-trigger flip-flops, RS flip-flops, master-slave flip-flops, or latches.

Figure 3:
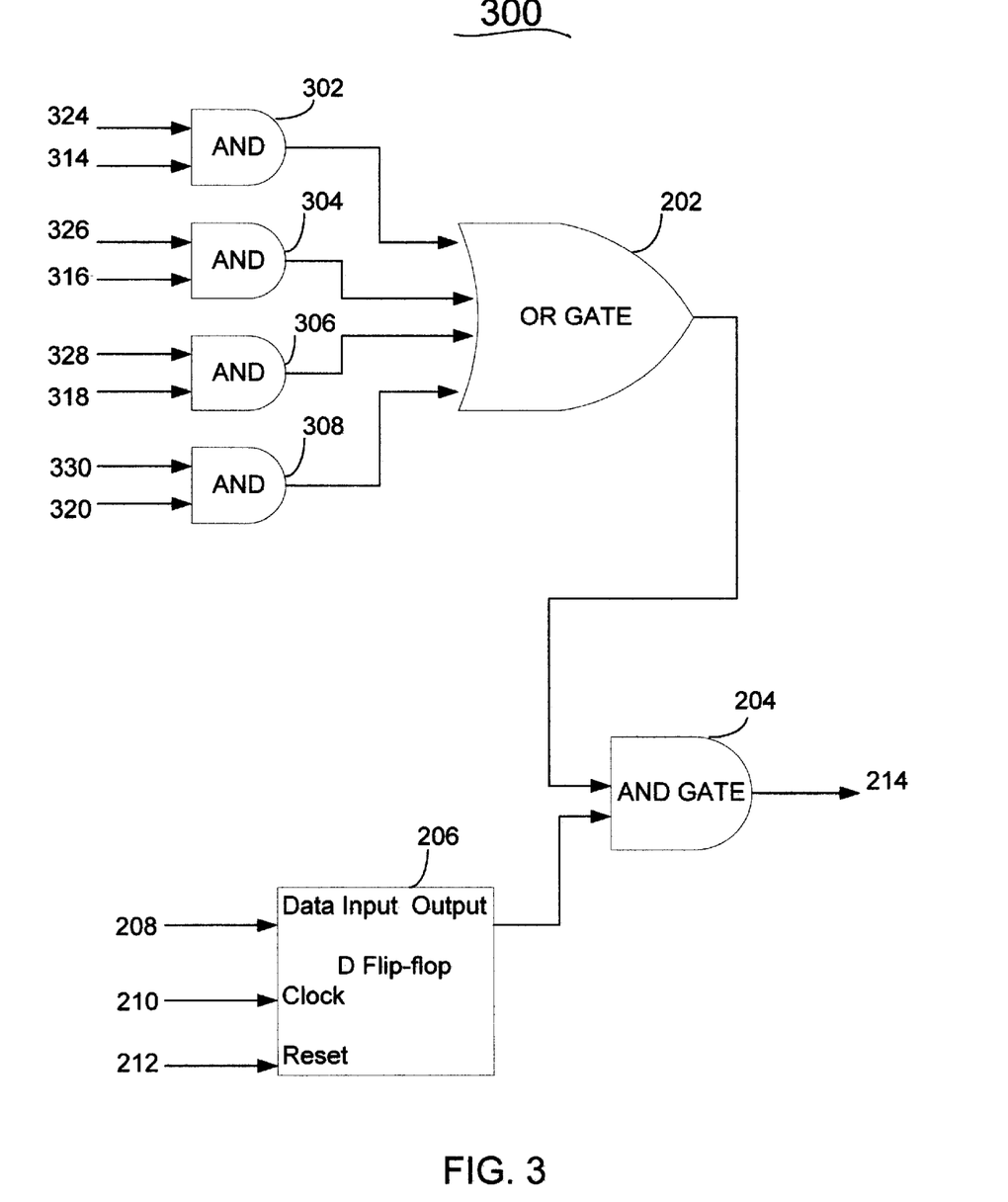
FIG. 3 shows a deadlock circuit, including a logical OR gate, a logical AND gate, a deadlock enable flip-flop, and four logical AND gates, in accordance with an alternative embodiment of the invention.

FIG. 3 shows a deadlock circuit 300, including logical OR gate 202, logical AND gate 204, deadlock enable flip-flop 206, and four logical AND gates 302, 304, 306, and 308, in accordance with an alternative embodiment of the invention. This embodiment uses separately enabled deadlock bits from the detection circuitry, instead of using deadlock bits from the primary error log 100. Logical AND gate 302 receives deadlock bit 314 and deadlock enable bit 324. Logical AND gate 304 receives deadlock bit 316 and deadlock enable bit 326. Logical AND gate 306 receives deadlock bit 318 and deadlock enable bit 328. Logical AND gate 308 receives deadlock bit 320 and deadlock enable bit 330. The outputs of logical AND gates 302, 304, 306, and 308 provides the input signals to logical OR gate 202, which produces an output signal that in an input signal to logical AND gate 204. Deadlock enable flip-flop 206 produces an output signal that is an input signal to logical AND gate 204 and receives deadlock enable signal 208, clock signal 210, and synchronous reset signal 212 as input signals. Logical AND gate 204 produces an output signal 214 which indicates that one or more deadlock errors have occurred and deadlock errors are enabled a group, even if some deadlock errors are individually disabled. Deadlock enable signal 208 is typically set by software at an appropriate time in the operation of the data processing system.

Figure 4:
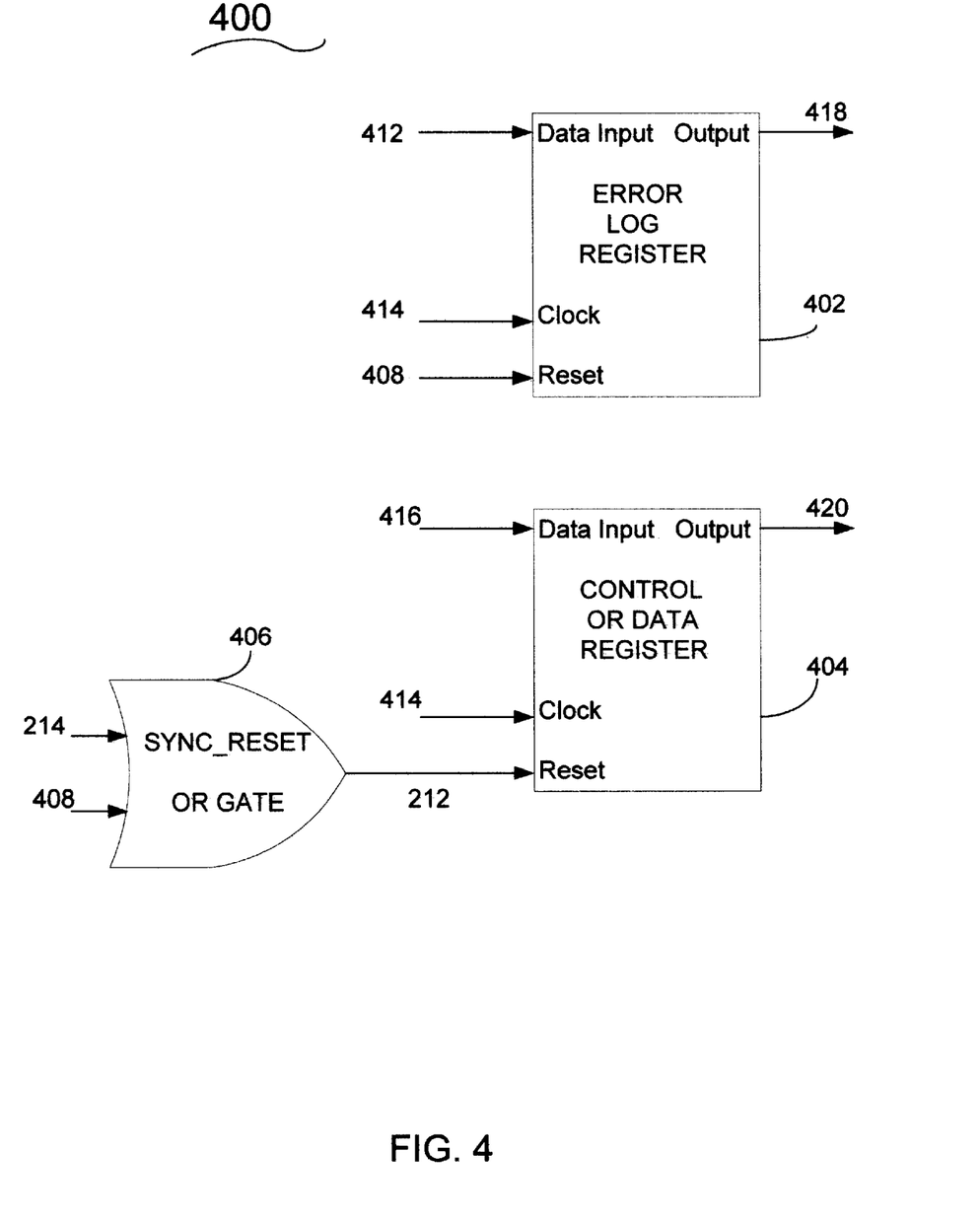
FIG. 4 illustrates a configuration that shows how an error log register is independently reset, compared to a control or data register that is reset by a synchronous reset signal from a logical OR gate, in accordance with a preferred embodiment of the invention.

FIG. 4 illustrates a configuration 400 that shows how an error log register 402 is independently reset, compared to a control or data register 404 that is reset by a synchronous reset signal from a logical OR gate 406, in accordance with a preferred embodiment of the invention. Logical OR gate 406 receives deadlock signal 214 and power-on reset signal 408 as input signals, and produces synchronous reset signal 212 that is a reset input signal to control or data register 404, and a reset input signal to the deadlock enable flip-flop 206 shown in FIGS. 2 and 3. Control or data register 404 also receives system clock signal 414 and input signal 416, and produces output signal 420. Error log register 402 receives input signal 412, system clock signal 414, and power-on reset signal 408 as input signals and produces output signal 418. Error log register 402 receives only power-on reset signal 408 and is not reset by synchronous reset signal 212 in order to save the contents of error log register 402 when a deadlock error occurs. Once power-on reset signal 408 is asserted, synchronous reset 212 is asserted and deadlock enable flip-flop 206 shown in FIGS. 2 and 3 is disabled, deactivating deadlock signal 214 shown in FIGS. 2 and 3. This prevents a deadlock error from continuously asserting a synchronous reset and continuously resetting the data processing system. Alternative embodiments of the invention can use alternative circuits besides a logical OR gate to produces a synchronous reset signal to reset the majority of memory cells in a data processing system, e.g., a logical AND gate with negative logic signals.

Figure 5:
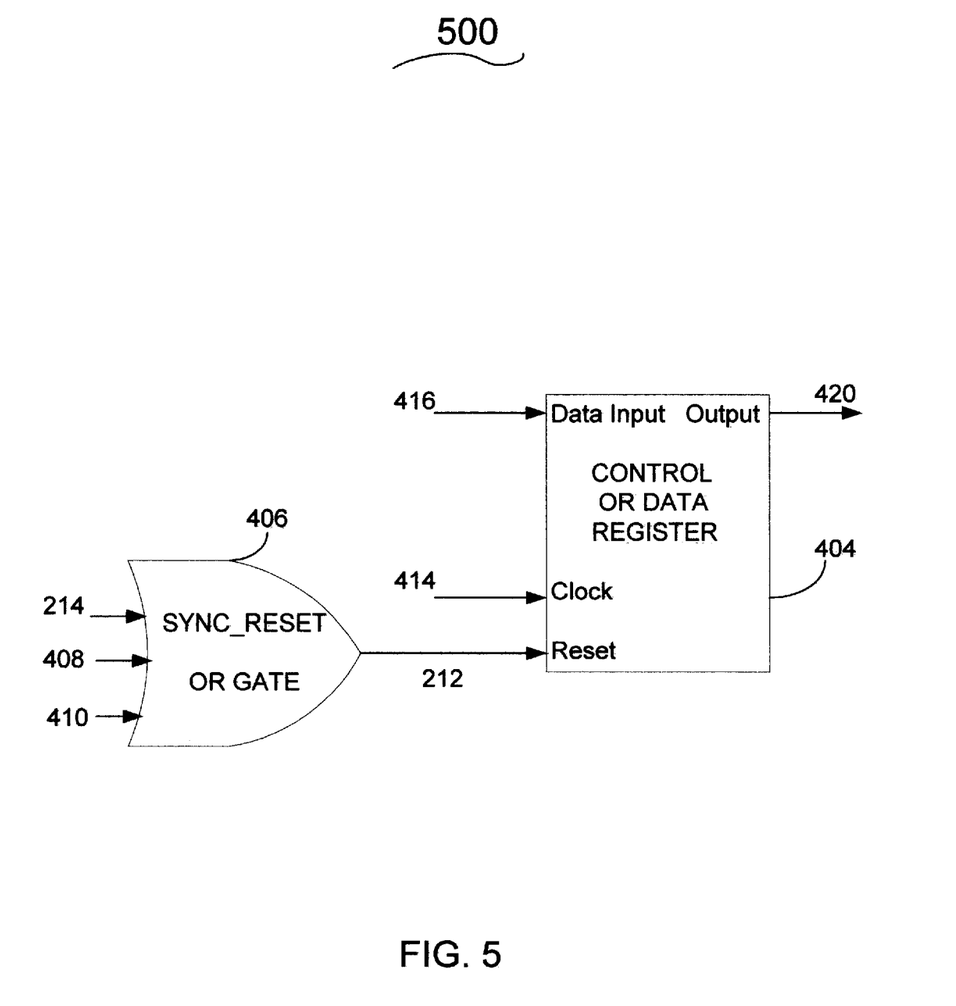
FIG. 5 illustrates a configuration that shows an alternative embodiment of the invention, including a control or data register that is reset by a synchronous reset signal from a logical OR gate.

FIG. 5 illustrates a configuration 500 that shows an alternative embodiment of the invention, including a control or data register 404 that is reset by a synchronous reset signal from a logical OR gate 406. Logical OR gate 406 receives deadlock signal 214, power-on reset signal 408, and software reset signal 410 as input signals, and produces synchronous reset signal 212 that is a reset input signal to control or data register 404, and a reset input signal to deadlock enable flip-flop 206 shown in FIGS. 2 and 3. Control or data register 404 also receives system clock signal 414 and input signal 416, and produces output signal 420. Once power-on reset signal 408 or software reset signal 410 is asserted, synchronous reset 212 is asserted and deadlock enable flip-flop 206 shown in FIGS. 2 and 3 is disabled, deactivating deadlock signal 214 shown in FIGS. 2 and 3. This allows a software program to produce software reset signal 410 and still prevents a deadlock error from continuously asserting a synchronous reset.

Figure 6:
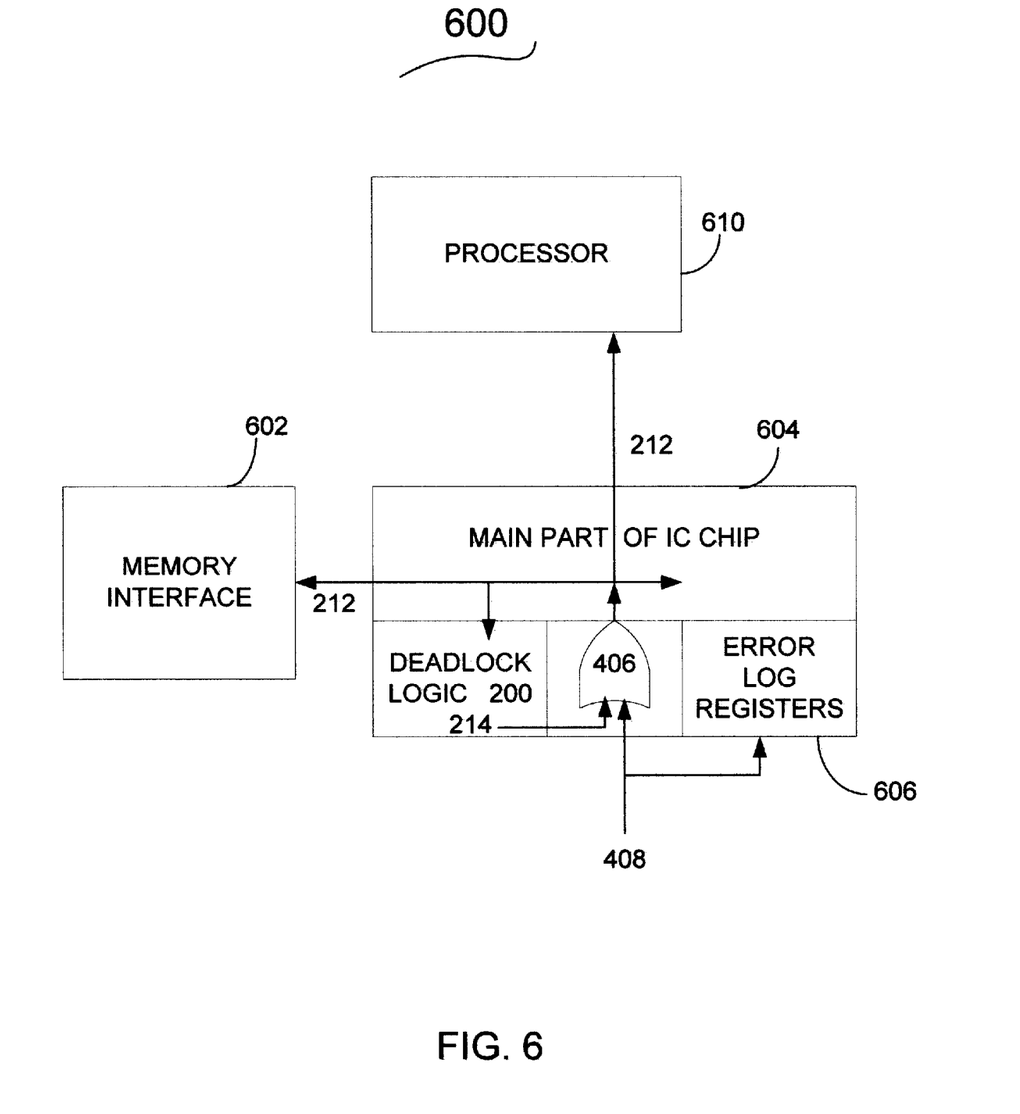
FIG. 6 illustrates a block diagram showing how a deadlock circuit, a synchronous reset gate, a memory interface, a main part of an integrated circuit (IC) chip, error log registers, and a processor interact in one preferred embodiment of the invention.

FIG. 6 illustrates a block diagram 600 showing how deadlock circuit 200, synchronous reset gate 406, memory interface 602, main part of an integrated circuit (IC) chip 604, error log registers 606, and processor 610 interact in one preferred embodiment of the invention. Synchronous reset gate 406 and error log registers 606 receive power-on reset signal 408. Deadlock logic circuit 200 produces the previously discussed deadlock signal 214 that is an input signal to synchronous reset gate 406, which provides synchronous reset signal 212 to memory interface 602, main part of the IC chip 604, processor 610, and deadlock logic circuit 200.

Figure 7:
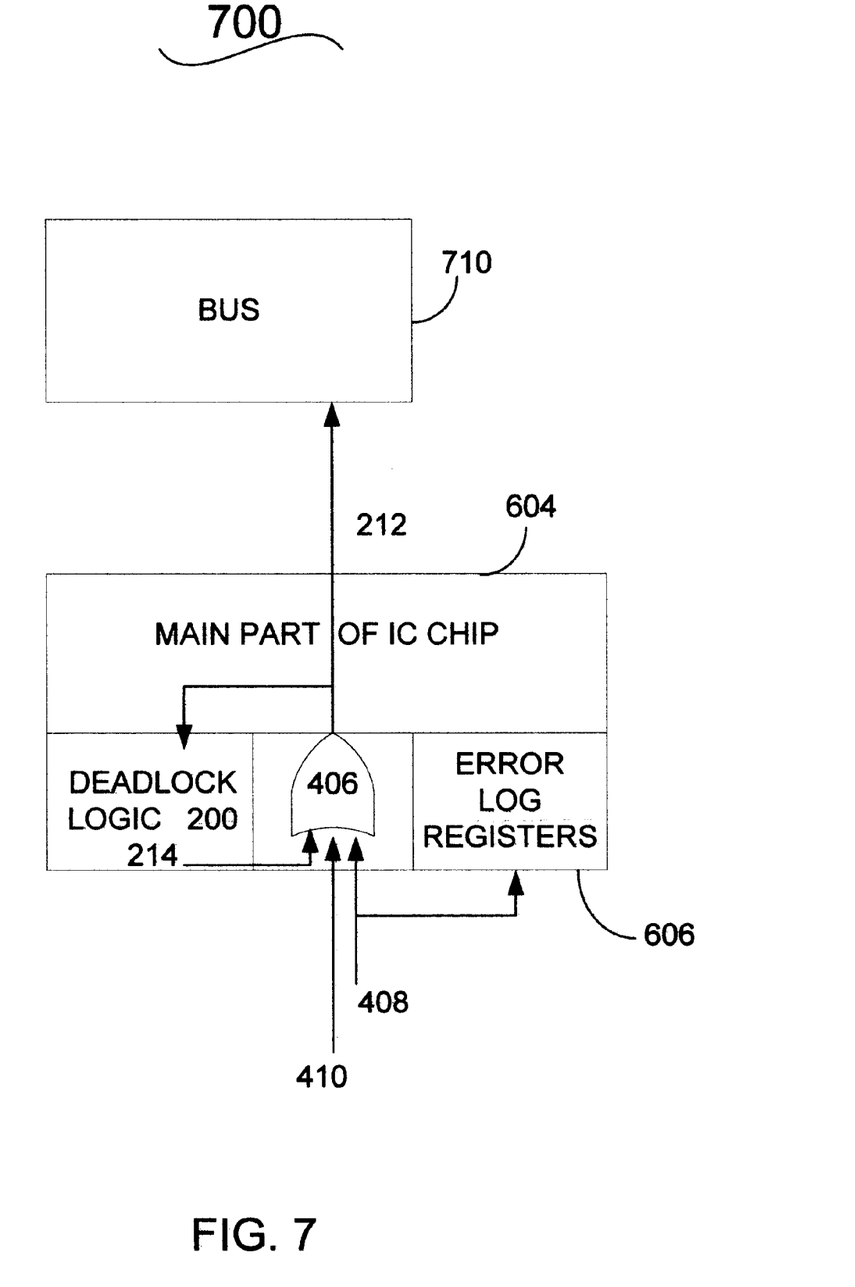
FIG. 7 illustrates a block diagram showing how a deadlock circuit, a synchronous reset gate, a bus, a main part of an IC chip, and error log registers interact in an alternative embodiment of the invention.

FIG. 7 illustrates a block diagram 700 showing how deadlock circuit 200, synchronous reset gate 406, bus 710, main part of an integrated circuit (IC) chip 604, and error log registers 606 interact in an alternative embodiment of the invention. Synchronous reset gate 406 receives deadlock signal 214, power-on reset signal 408, and software reset signal 410. Error log registers 606 receive power-on reset signal 408. Deadlock logic circuit 200 produces the previously discussed deadlock signal 214 that is an input signal to synchronous reset gate 406, which provides synchronous reset signal 212 to bus 710, main part of the IC chip 604, and deadlock logic circuit 200.

Figure 8:
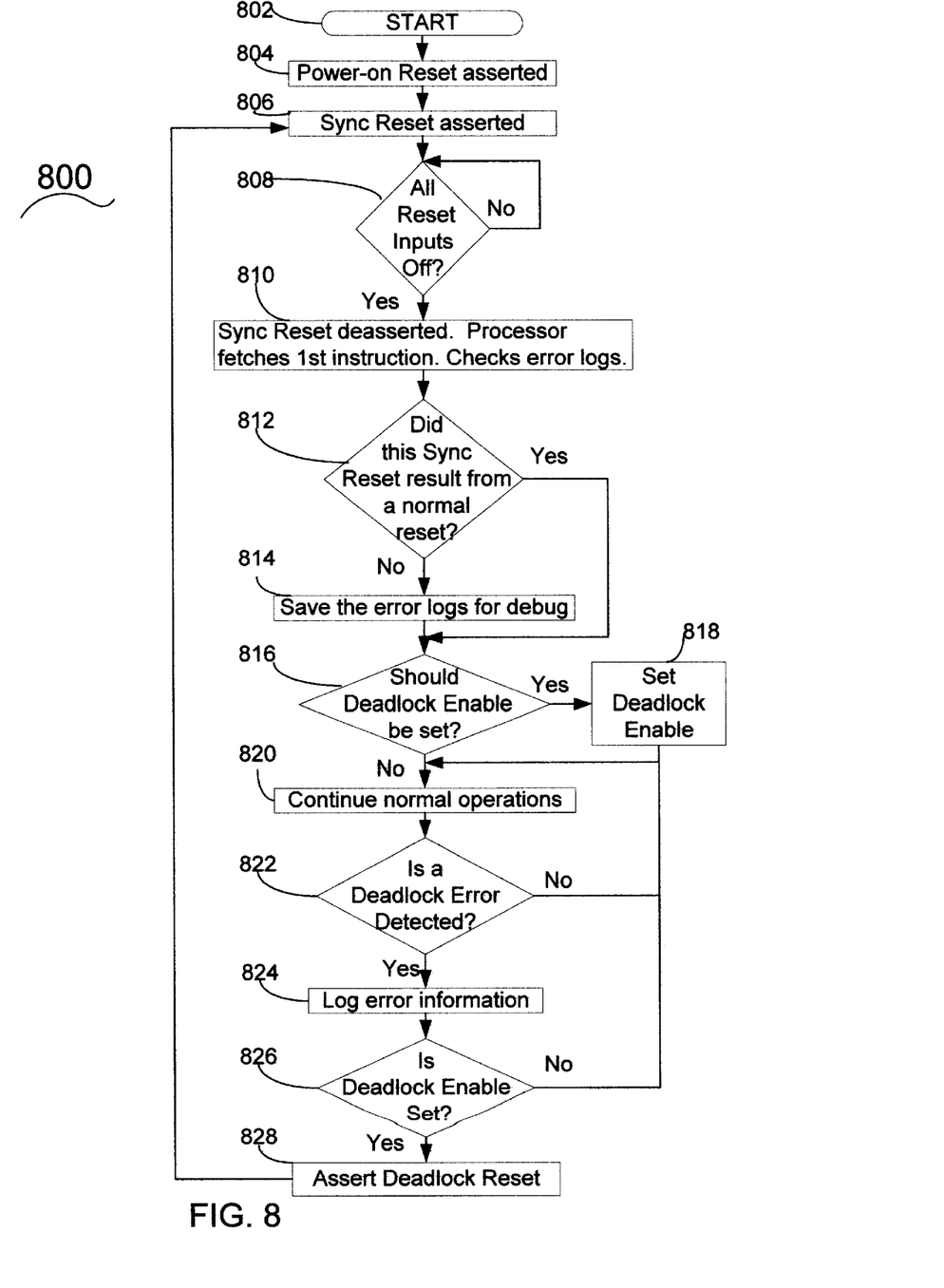
FIG. 8 illustrates a flow chart of a method for detecting deadlock errors, logging deadlock error information, and enabling deadlock errors in a data processing system in accordance with one embodiment of the invention.

FIG. 8 illustrates a flow chart 800 of a method for detecting deadlock errors, logging deadlock error information, and enabling deadlock errors in a data processing system in accordance with one embodiment of the invention. The method starts in operation 802. In operation 804, the data processing system has a power-on reset signal asserted. In operation 806, the synchronous reset signal is asserted as a consequence of the power-on reset signal assertion. In operation 808, a test is made to determine if the all the reset input signals are de-asserted. If not, then operation 808 is repeated. If all the reset signals are de-asserted, then operation 810 is next. In operation 810, the data processing system begins to perform normal data processing system processing tasks by fetching and executing instructions. Eventually, the error logs will be checked to determine what caused the reset. In operation 812, a test is made to determine if this synchronous reset was the result of a normal reset, i.e., this reset was not the result of a deadlock error. If the synchronous reset was caused by a deadlock error, then operation 814 is next, where the error logs are saved for future debug of the deadlock error. If the synchronous reset was not caused by a deadlock error, then operation 816 is next. In operation 816 a test is made to determine if the deadlock enable flip-flop should be enabled. If the deadlock enable flip-flop should be enabled, operation 818 is next, where the deadlock enable flip-flop is enabled and operation 820 is next. If the deadlock enable flip-flop should not be enabled, then operation 820 is next. In operation 820, the data processing system continues normal operations. In operation 822, a test is made to determine if a deadlock error is detected. If no deadlock error is detected, then operation 820 is next and the data processing system continues normal operations. If a deadlock error is detected, then operation 824 is next. In operation 824, the deadlock error information is logged in the error registers for future debug. Then operation 826 is next, where a test is made to determine is the deadlock enable flip-flop is set (enabled). If the deadlock enable flip-flop is not set, then operation 820 is next and the data processing system continues normal operations. If the deadlock enable flip-flop is enabled, then operation 828 is next. In operation 828, the deadlock signal is asserted and operation 806 is next, where the synchronous reset signal is asserted.

When it is time to clear the error logs, a processor reads the error log information, performs any appropriate actions, and transfers the information to an appropriate destination, such as a disk memory, a printer for print out, or some other kind of peripheral device. The processor clears the error logs when the information is no longer useful and the error logs would be more usefully employed in recording data processing system errors by recording any errors that occur during a new session.

One application of the invention involves an IC chip replicated many times in a data processing system, with two separate reset signals sent throughout each IC chip. One reset signal (POWER_ON) is asserted only when a power-on reset event is occurring. The other reset signal (SYNC_RESET) is asserted whenever POWER_ON is asserted, and also when a software reset signal (SOFT_RESET) is asserted. All non-error log circuitry uses SYNC_RESET to reset the state of the circuitry. The error log circuitry uses POWER_ON to reset the state of the circuitry. An error severity level, called a deadlock error, occurs when some queue in the data processing system has been blocked for a long time (typically around one second). When an error of this level is detected, the queue that is blocked is logged in an error log register. Then a signal is sent to the reset circuitry on the chip, which asserts SYNC_RESET for the required time. This resets the chip almost like a true power-on reset event, except that the error log registers are not reset. This chip reset signal produces a system reset (as a side-effect of resetting a chip, it drives its outputs in such a way as to propagate the reset to any chip to which it already sends a reset signal). The data processing system boot (start-up) firmware (low-level software) starts running on the processors. The boot firmware can detect the deadlock error, and copy the error log registers to a safe memory location and diagnose the deadlock error. A register that clears after reset (using SYNC_RESET) disables deadlock errors, which prevents ping-pong reset problems with continuous resets. It also allows the deadlock errors to be enabled. The error log registers record the critical queue depths across the chip, allowing firmware to diagnose the queue that is blocked, and thus which component most likely failed. When the deadlock error occurs on a chip replicated many times in data processing system, this is a strong indication that the chip itself has failed.

The invention offers several advantages. The deadlock error allows the chip to reset itself to recover from many types of errors or design flaws. If a system bus entered an illegal state and can no longer function, the deadlock error causes a reset that uses the existing reset logic to restore all states to known values and enables the boot firmware to execute properly for a successful data processing system reboot. Since the chip logs error information in the error logs about the queue blockage, firmware can more easily diagnose what to replace in the data processing system.

The invention requires a minimal amount of extra circuitry, such as the queue blockage detection circuitry, and extra circuitry in the reset circuitry to logically AND the existing reset signal with the reset signal caused by the deadlock error. Therefore, the required circuitry is much less expensive and complex than the circuitry to implement a scan interface to scan out the chip's internal logic state. Furthermore, alternative embodiments of the invention could be applied to other types of errors besides deadlock errors, such as certain types of fatal errors or uncorrectable errors.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method for indicating a deadlock error in a data processing system capable of having at least one deadlock error, comprising steps of:
   indicating that an error is at least one deadlock error;
   providing an input signal to set a deadlock error enable circuit having an output signal indicating that said at least one deadlock error will cause a deadlock reset signal to be asserted;
   logically ORing a plurality of signals including said at least one deadlock error with a first combinational logic circuit having a deadlock output; and
   logically ANDing said deadlock output of said first combinational logic circuit and said output signal of said deadlock error enable circuit with a second combinational logic circuit having an output to produce said deadlock reset signal.

2. The method of claim 1, further comprising the step of logically ORing a first reset signal and said deadlock reset signal to produce a synchronous reset output signal.

3. The method of claim 2, further comprising the step of resetting a plurality of error log registers with said first reset signal.

4. The method of claim 2, further comprising the step of resetting a plurality of control and data registers with said synchronous reset output signal.

5. The method of claim 2, further comprising the step of resetting said deadlock error enable circuit with said synchronous reset output signal.

6. The method of claim 2, wherein said first reset signal is a power-on reset signal.

7. The method of claim 2, wherein said step of providing an input signal to set said deadlock error enable circuit includes software providing a data signal to set said deadlock error enable circuit.

8. A data processing system, capable of having a deadlock error selected from a plurality of deadlock errors, comprising:

a deadlock error enable circuit receiving a plurality of input enable signals and having an output signal indicating that said deadlock error will cause a deadlock reset signal to be asserted;
   a first combinational logic circuit to logically OR a plurality of deadlock signals, having a deadlock output; and
   a second combinational logic circuit to logically AND said deadlock output of said first combinational logic circuit and said output signal of said deadlock error enable circuit, said second combinational logic circuit having an output to produce said deadlock reset signal.

9. The data processing system of claim 8, further comprising a logical OR gate to logically OR a first reset signal and said deadlock reset signal, said logical OR gate producing a synchronous reset output signal.

10. The data processing system of claim 9, further comprising a plurality of error log registers that are reset when said first reset signal is asserted.

11. The data processing system of claim 9, further comprising a plurality of control and data registers that are reset when said synchronous reset output signal is asserted.

12. The data processing system of claim 9, wherein said deadlock error enable circuit is reset when said synchronous reset output signal is asserted.

13. The data processing system of claim 9, wherein said first reset signal is a power-on reset signal.

14. The data processing system of claim 8, wherein said first combinational logic circuit is a logical OR gate, said second combinational logic circuit is a logical AND gate, and said plurality of input enable signals includes a clock signal and a data signal provided by software.

15. An error log system, including a set of registers to record a deadlock error from a plurality of deadlock error types, comprising:

an error log to record at least one deadlock error;
   a deadlock error enable circuit receiving a plurality of input signals and having an output signal indicating that said deadlock error will cause a deadlock reset signal to be asserted;
   a first combinational logic circuit to logically OR a plurality of deadlock error signals, having a deadlock output; and
   a second combinational logic circuit to logically AND said deadlock output of said first combinational logic circuit and said output signal of said deadlock error enable circuit, said second combinational logic circuit having an output to produce said deadlock reset signal.

16. The error log system of claim 15, further comprising a logical OR gate to logically OR a first reset signal and said deadlock reset signal, said logical OR gate producing a synchronous reset output signal.

17. The error log system of claim 16, further comprising a plurality of error log registers that are reset when said first reset signal is asserted.

18. The error log system of claim 17, further comprising a plurality of control and data registers that are reset when said synchronous reset output signal is asserted.

19. The error log system of claim 16, wherein said deadlock error enable circuit is reset when said synchronous reset output signal is asserted.

20. The error log system of claim 16, wherein said first reset signal is a power-on reset signal, said first combinational logic circuit includes a logical OR gate, and said second combinational logic circuit includes a logical AND gate.

* * * * *